US010834050B2

(12) United States Patent
Call et al.

(10) Patent No.: US 10,834,050 B2
(45) Date of Patent: Nov. 10, 2020

(54) MODIFYING AUTHENTICATION FOR AN APPLICATION PROGRAMMING INTERFACE

(71) Applicant: Shape Security, Inc., Palo Alto, CA (US)

(72) Inventors: Justin D. Call, Mountain View, CA (US); Timothy D. Peacock, San Francisco, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 461 days.

(21) Appl. No.: 15/671,017

(22) Filed: Aug. 7, 2017

(65) Prior Publication Data
US 2018/0026943 A1  Jan. 25, 2018

Related U.S. Application Data

(63) Continuation of application No. 14/466,779, filed on Aug. 22, 2014, now Pat. No. 9,729,506.

(51) Int. Cl.
| | |
|---|---|
| *H04L 9/32* | (2006.01) |
| *G06F 21/30* | (2013.01) |
| *H04L 29/06* | (2006.01) |
| *G06F 9/54* | (2006.01) |
| *G06F 21/62* | (2013.01) |
| *H04L 12/26* | (2006.01) |

(52) U.S. Cl.
CPC .............. *H04L 63/02* (2013.01); *G06F 9/547* (2013.01); *G06F 21/629* (2013.01); *H04L 29/06557* (2013.01); *H04L 43/045* (2013.01); *H04L 43/062* (2013.01); *H04L 63/0236* (2013.01); *H04L 63/101* (2013.01); *G06F 2221/2141* (2013.01)

(58) Field of Classification Search
CPC ........... G06F 21/629; G06F 2221/2141; G06F 9/547; H04L 29/06557; H04L 63/02; H04L 63/0236; H04L 63/101; H04W 4/005
See application file for complete search history.

(56) References Cited

U.S. PATENT DOCUMENTS

| | | | |
|---|---|---|---|
| 5,828,833 | A | 10/1998 | Belville |
| 5,974,549 | A | 10/1999 | Golan |

(Continued)

FOREIGN PATENT DOCUMENTS

| | | |
|---|---|---|
| GB | 2465998 | 9/2010 |

OTHER PUBLICATIONS

NOA, mailed on Mar. 10, 2017, re: Justin D. Call, U.S. Appl. No. 14/466,779, filed Aug. 22, 2014.

(Continued)

*Primary Examiner* — Theodore C Parsons
(74) *Attorney, Agent, or Firm* — Troutman Pepper Hamilton Sanders LLP (Rochester)

(57) ABSTRACT

Application programming interfaces (APIs) can be unintentionally exposed and allow for potentially undesirable use of corporate resources. An API call filtering system configured to monitor API call requests received via an endpoint and API call responses received via a supporting service of an API or web service. The API call filtering system enables enterprises to improve their security posture by identifying, studying, reporting, and securing their APIs within their enterprise network.

24 Claims, 9 Drawing Sheets

(56) References Cited

U.S. PATENT DOCUMENTS

| | | |
|---|---|---|
| 7,913,300 B1 | 3/2011 | Flank |
| 8,782,744 B1 | 7/2014 | Fuller |
| 9,027,039 B2 | 5/2015 | Michels |
| 9,313,203 B2 | 4/2016 | Adler |
| 2004/0237071 A1 | 11/2004 | Hollander et al. |
| 2005/0165902 A1 | 7/2005 | Hellenthal |
| 2006/0095968 A1 | 5/2006 | Portolani |
| 2007/0276950 A1 | 11/2007 | Dadhia |
| 2008/0183902 A1 | 7/2008 | Cooper |
| 2008/0244078 A1 | 10/2008 | Viljoen |
| 2009/0144829 A1 | 6/2009 | Grigsby |
| 2009/0158430 A1 | 6/2009 | Borders |
| 2009/0193497 A1 | 7/2009 | Kikuchi |
| 2011/0289566 A1 | 11/2011 | Resch |
| 2012/0180021 A1 | 7/2012 | Byrd |
| 2012/0246722 A1 | 9/2012 | Boney |
| 2013/0055287 A1 | 2/2013 | Pope |
| 2013/0139235 A1 | 5/2013 | Counterman |
| 2013/0205919 A1 | 8/2013 | Bousack |
| 2013/0212603 A1 | 8/2013 | Cooke |
| 2014/0007048 A1 | 1/2014 | Qureshi |
| 2014/0040787 A1 | 2/2014 | Mills |
| 2014/0123242 A1 | 5/2014 | Sprunk |
| 2014/0189845 A1* | 7/2014 | Cai .................... H04L 63/0245 726/12 |
| 2014/0237594 A1* | 8/2014 | Thakadu ................. G06F 21/52 726/23 |
| 2014/0282821 A1 | 9/2014 | Adler |
| 2014/0283068 A1 | 9/2014 | Call |
| 2015/0350234 A1 | 12/2015 | Reno |
| 2015/0365348 A1 | 12/2015 | Matsuda |
| 2016/0001407 A1 | 1/2016 | Hansen et al. |
| 2016/0001408 A1 | 1/2016 | Watford et al. |
| 2016/0016268 A1 | 1/2016 | Dockery et al. |
| 2016/0019146 A1 | 1/2016 | Vekiarides et al. |
| 2018/0026943 A1 | 1/2018 | Call |

OTHER PUBLICATIONS

NOA, mailed on Oct. 24, 2016, re: Justin Call, U.S. Appl. No. 14/466,779, filed Aug. 22, 2014.
CTFR, mailed on Jun. 17, 2016, re: Justin Call, U.S. Appl. No. 14/466,779, filed Aug. 22, 2014.
CTNF, mailed on Jan. 20, 2016, re: Justin Call, U.S. Appl. No. 14/466,779, filed Aug. 22, 2014.
CTNF, mailed on Nov. 24, 2014, re: Justin Call, U.S. Appl. No. 14/466,779, filed Aug. 22, 2014.
CTFR, mailed on Jun. 17, 2015, re: Justin Call, U.S. Appl. No. 14/466,779, filed Aug. 22, 2014.
In-the-wire authentication: Protecting client-side critical data fields in secure network transactions, Jan. 14, 2009.
A Closer Look at Rapport from Trusteer, Apr. 29, 2010.
International Search Report, dated Feb. 4, 2016, PCT/US15/63811.
International Search Report, dated Nov. 5, 2015, PCT/US15/44630.
International Search Report, dated Oct. 23, 2015, PCT/US15/39762.

* cited by examiner

MODIFYING AUTHENTICATION FOR AN APPLICATION PROGRAMMING INTERFACE

CROSS-REFERENCES TO PRIORITY AND RELATED APPLICATIONS

This application is related to and incorporates by reference for all purposes the full disclosure of co-pending U.S. patent application Ser. No. 14/327,461, entitled "USING INDIVIDUALIZED APIs TO BLOCK AUTOMATED ATTACKS ON NATIVE APPS AND/OR PURPOSELY EXPOSED APIs," filed Jul. 9, 2014. The entire disclosure of the application recited above is hereby incorporated by reference, as if set forth in full in this document, for all purposes in its entirety.

FIELD OF THE INVENTION

The present invention relates generally to networked computer system security, and more particularly to protection and monitoring of application programming interfaces in an enterprise network.

BACKGROUND

Enterprises are operating on computer networks that operably interconnect computing devices to support and manage business needs, provide resources, deliver services, and provide interactive web services. The security of an enterprise's data and network resources is of high priority in many circumstances, especially when public Internet users access data or web services via application programming interfaces (APIs) within the enterprise network. However, APIs are currently a driving force in the expansion of data management, web services, and private cloud network systems that the business demand for maintaining useful APIs is too high to ignore. As such, enterprises are having to increase their security and monitoring of their networks.

APIs are software methods to allow machine-to-machine communication. APIs can enable arbitrary operations on computers, examples range from accessing data through under-authenticated APIs, to creating user accounts, to stealing personally identifiable information, protected health information, or protected financial data, to taking other actions.

Some of those operations might be considered legitimate while others considered not legitimate. For example, consider a brokerage website that provides an API to its customers to provide stock quote updates for stocks held by those customers. Having a customer's smartphone make API calls hourly to grab updates for stocks held by that customer might be considered legitimate, whereas making API calls every half second to download all stocks traded on an exchange might not be considered a legitimate use of the API. Likewise, API calls to get one's own bank balance might be considered legitimate, whereas making API calls to try and access someone else's bank balance might not be considered legitimate.

Typically, enterprises deploy private cloud-based computer networks inside their networks and behind their firewalls. Such entities generally have strict policies on what data is allowed to exit their network and may even have different clouds for different purposes. Despite such policies, many large organizations intentionally, unintentionally, knowingly, and unknowingly expose APIs to the Internet public.

APIs can be unintentionally exposed and allow for potentially undesirable use of corporate resources, and security teams have little visibility and less control over what APIs teams inside of their organization make available. Because APIs allow direct instruction of machines and often in ways that the organization's department may not be aware of, security teams have a major challenge in controlling API access from outside of an organization or between two portions of an organization (as might be used to detect examples of compromised endpoints or compromised services inside the organization).

Therefore, it would be desirable to increase the ability for enterprise security teams and management to maintain closer control and monitoring of their enterprise web services in a way that makes it manageable and cost effective for security teams to monitor and modify the API/web service permissions, requests, and responses.

SUMMARY

Example embodiments may include an application programming interface (API) call filtering system to filter API call requests received, via a network, from a user device that is network-connected and configured to run endpoint application hardware and/or software in order to secure an API service that accepts API call requests and provides API call responses thereto. The API call filtering system is configured to monitor for API call requests to an API received from an endpoint, such as an end user device or an instance of an application, to a server configured to provide the API service. The system may further compile performance indicators of the API call requests, analyze the compiled performance indicators, and create at least one report that includes the analysis of the performance indicators and at least one recommendation of an action or non-action to take in response to the API call request.

The API filtering system, also referred to herein as an API wall, includes creating a dashboard including information regarding performance indicators related to the endpoint application/device, such as monitoring a frequency, a velocity, a time of day, a geo-location, or an authentication indicator related to the API call requests. The API wall further provides a report for a security team of an enterprise or other system user such that the security team can change access permissions for the API, wherein the access permission changes include modifying the access to the API, limiting access to the API, or blocking access to the API based on many factors, including the performance indicators. The system further provides security teams the ability to change the access permissions for the API from unauthenticated access permissions to authenticated access permissions.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Figure 1A:
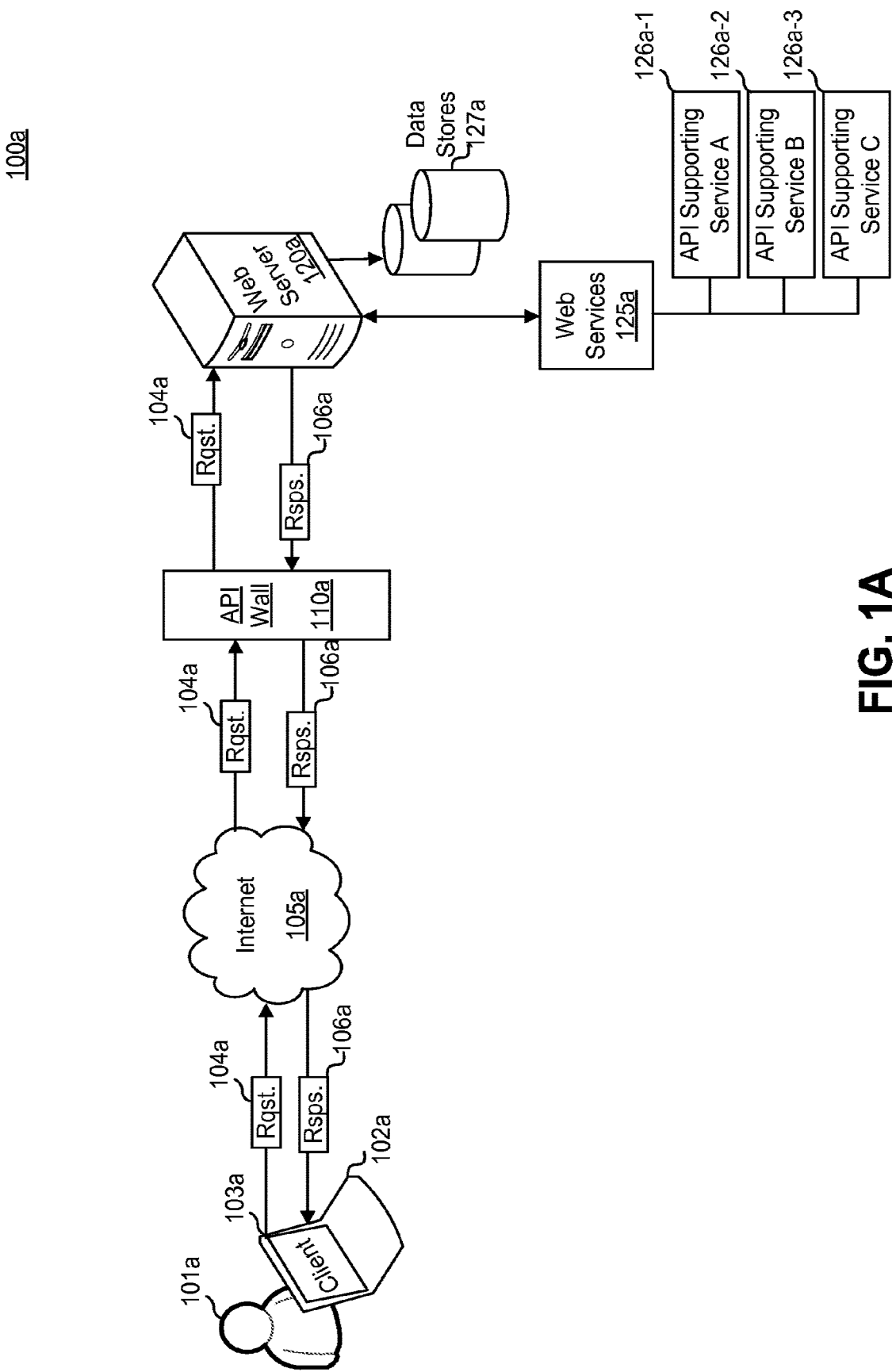
FIG. 1A is an example embodiment of a computer-network environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Network resources might include information, financial value, computing resources, or the like. For example, online-stored e-mails, online-stored personal photo, bank accounts with online transfer capability, online shopping services, computing power, etc., are all forms of network resources.

Network services might include uploading data, downloading data, interacting with server-side programs over a network, access to physical resources (e.g., printers, cameras, other equipment, etc.), communication services, or similar services that might be provided over a network. Network services might be provided by a Hypertext Transfer Protocol (HTTP) server coupled to a back-end data processing system, or the like. Other network protocols might be used, as appropriate. As used herein, unless otherwise stated or clear from context, the term "service" may be understood to be a computer system program, process, client, server, service, application, module, operating system entity, controlling domain, communication node or collection of these and/or other such computer system entities.

The network can be the Internet, an intranet, an extranet, a local-area network (LAN), a wide-area network (WAN) or similar network that connects computers/devices/systems at network nodes to at least some other network nodes, thereby allowing users to use the network services.

As used herein, at least for the sake of readability, participants in a transaction might be referred to as a "user" and a "network service provider" but it should be understood that these labels might sometimes refer to humans or computers as users and/or persons, business groups, organizations, etc. as network service providers, even though specifically and technically it may well be that an electronic device operated by, or at the behest of, a user is what is doing the interaction and the interaction is with computer/electronic hardware operated by, or at the behest of, a network service provider.

Electronic user devices might include computers, tablets, wearable computer devices, smartphones, embedded computer systems, or other devices.

Also, for the sake of readability, explanations are provided in the context of a user/user device running an "app" that interacts over the network with a server where the app and the server are coordinated such that the way the app interacts with the server is at least familiar to the server and vice versa. Unless otherwise indicated, the app can be a program running at the user device in user space, in system space, in browser space, etc. and can be a simple or complex program with a general or specific purpose. Thus, the "app" designation herein is not, unless otherwise indicated, limited to specific types of programs.

Most often, network resources are constrained so access to those network resources should be limited to those users and user devices that are authorized to access those resources and mechanisms would be used to block unauthorized access to those resources, or at least thwart unauthorized access enough to make it uninteresting to those persons or organizations that would attempt unauthorized access. Common examples of network resources that are constrained might include a messaging (e-mail, text, etc.) server that sends, stores, retrieves messages, some of which are not intended to general viewing, or an online banking application that might provide access to confidential financial information and the ability to transfer funds or obligate an account owner in some way.

Cloud Computing, as commonly used, includes requesting and delivering computational resources as a service, where the resources, software, and other information are provided to user devices via a network from a computing resource service provider, which may be an Infrastructure-as-a-service (IaaS), platform-as-a-service (PaaS) and/or software-as-a-service (SaaS) provider. Clouds are generally categorized into public and private clouds. Alternative cloud platforms exist, and may similarly apply to embodiments presented herein, such as a hybrid, public-private cloud.

A private cloud may be part of an enterprise network or enterprise computing infrastructure protected by a firewall or, in examples presented herein, by an API wall, located at the network perimeter of the enterprise network. A private cloud may enable an organization or security team of an enterprise to maintain additional or increased control over the organizations data than may otherwise be available using a third-party hosted service. Unlike the private cloud model, a public cloud is made available to the public over the Internet by a service provider of resources, such as database resources, applications, computational resources, and the like. As used herein, it should be understood that the "network perimeter" does not have to be at the boundary of a specific enterprise network; the network perimeter might refer to an intra-organization boundary, where an API wall exists between two or more portions of an organization's network infrastructure.

Infrastructure-as-a-Service (IaaS) APIs may be used to control cloud resources and the distribution of cloud resources at the infrastructure-level. For example, IaaS APIs may be used to provision and de-provision computational resources or configure virtual machines or containers for use in a user's network. Other APIs may include cross-platform APIs, streaming APIs, web APIs, etc.

Platform-as-a-Service (PaaS) APIs include service-level APIs designed to provide interaction and functionality with a cloud environment, such as through integration of databases, storage systems, messaging systems, handling systems, and the like.

Software-as-a-Service (SaaS) APIs include application-level or application-layer connectivity with a cloud environment and the IT infrastructure of that cloud environment, which, for example, enable end users, developers, etc. to create cloud application extensions for the environment.

Just as there are multiple types of cloud-based models, APIs come in different forms. For example, a public API (open API) may provide developers with programmatic access to proprietary software applications hosted by a third party.

A web API, sometimes used interchangeably, as a web service, is an application programming interface used for web development and other uses; usually defined as a set of Hypertext Transfer Protocol (HTTP) request messages or calls and a definition of structure for response messages (commonly programmed using Extensible Markup Language (XML) and/or JavaScript® Object Notation (JSON)). The use of a web API enables an end user or developer to combine multiple APIs into a new/modified/different application, commonly referred to as mashups or mashup APIs.

This document describes systems and techniques for enabling enterprises and organizations to improve security posture in private or semi-private, cloud-based network architectures by identifying, studying, reporting, and securing the enterprise's APIs. In particular, by monitoring API call requests from an endpoint application or user device, as well as monitoring API call responses from a web server or supporting API service, the enterprise may receive and track valuable data related to the use of the enterprise's APIs, and being enabled to effect the outcome of the API call requests with little or no backend programming changes and with little or no resource cost to the end user. This is useful in the case where the development team and the security teams within an enterprise are distinct, as is often the case. With these approaches, an enterprise's APIs can be secured without requiring that the security team know all of the intimate details of the operations of the enterprise's APIs and the development/publishing teams know all of the intimate details of how the security measures are implemented.

An API wall or API call filtering system according to example embodiments presented herein would function in a manner such that the system (whether packaged as virtualized software or as software on a physical appliance) sits at the logical perimeter of a network (such as an enterprise's network boundary, or an intra-organizational boundary to be secured). From its position at the perimeter of a network, the API wall is configured to inspect incoming requests to API resources. In monitoring mode, the API wall is able to produce reports and dashboards on API use across an enterprise. An API wall is also able to intercept requests. Intercepted API calls can be modified in real-time, or disabled.

Security teams administering the API wall are able to configure access control lists (ACLs) for unique APIs, giving security team's granular access control for specific APIs. ACLs might come in many different forms, providing flexible ways to manage control. For example, access might be by geographical location, date/time limitations, IP address limitations, limitations based on whether a caller possesses a particular private key or symmetric key, and the like.

FIG. 1A is an example embodiment of a computer-network environment 100a for implementing aspects in accordance with various embodiments. As will be appreciated, although an Internet environment 100a is used for purposes of explanation, different environments may be used, as appropriate, to implement various embodiments. The environment 100a includes a user, such as a human user 101a interacting with a web server 120a via a user device 102a. The user device includes an endpoint application and/or client 103a that is used to connect to the web server via a network, such as the Internet 105a. The client may be a computer program or application, such as a web browser, that is configured to make client requests for resources from web services via a public or private network, or a combination thereof.

Example embodiments of the present invention include an application programming interface (API) wall, herein referred to as an "API wall," which may be implemented in hardware, software, or cloud-based code executing on the API wall device. The API wall 110a is generally located between a public network, such as the Internet 105a, and a private or enterprise network (explained in detail below regarding FIG. 2) where the web server 120a is hosted. The API wall also might be located between different intra-organization services or systems.

For example, the web server 120a may be implemented as hardware and/or software, such as a program that serves files and documents that form web pages that users, such as the user 101a, may request resources from a web service, where the endpoint application is used to forward a request 104a to the web server, which, in turn returns a response 106a. The example of the web server 120a is operably interconnected to data stores 127a and includes or is operably interconnected with web services 125a. The web services may include APIs supporting different functions, enterprise departments, business units, and the like. For example, API supporting service A 126a-1, API supporting service B 126a-2, and API supporting service C 126a-3.

Figure 1B:
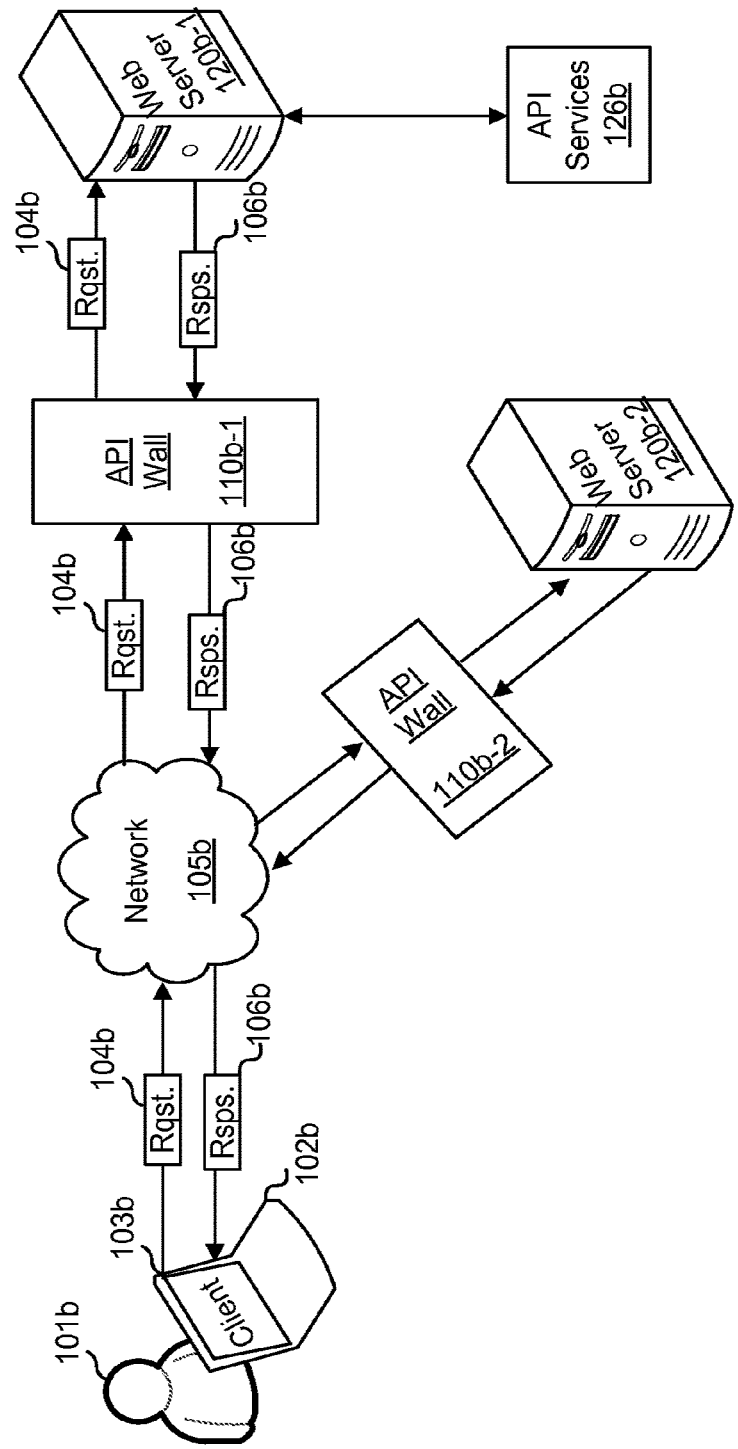
FIG. 1B is an example embodiment of a computer-network environment within an enterprise network in accordance with at least one embodiment.

FIG. 1B illustrates an alternative example embodiment such that the API wall is deployed between different services, such as between different intra-organizational services.

The environment 100b includes a user, such as a human user 101b interacting with a web server 120b-1 or 120b-2 via a user device 102b. The user device includes a mid-point application and/or client 103b that is used to connect to the web server via a network, such as the intra-network 105b with the enterprise network 150. The client may be a computer program or application, such as a web browser, that is configured to make client requests for resources from web services via a private network, or a combination of networks, wherein the users are users of the enterprise network, within the organization.

The API wall 110b may be located in a network 105b, which may be an intranet or similar network that connects computers/devices/systems at network nodes to at least some other network nodes within the enterprise network, thereby allowing users to use the network services. For example, the API wall 110b-1 may be located in a private network or an enterprise network where a web server 120b-1 is hosted and that services API services 126b, and may be deployed between multiple web servers hosted in a private network. A first team, such as a security team, may have lateral visibility within the enterprise network of an organization in order to monitor API requests from one or more internal groups.

Further, a security team may have access to all API requests within the enterprise network; for example, when a first department sends requests, such as requests 104b, for a second department's API, the security team may monitor such requests for suspicious access within the organization, where such access may indicate a compromised endpoint or service within the enterprise network. The security team may monitor the requests 104b and intercept them, change them, or respond in a manner determined by the security team with response 106b. Further, the security team or other monitoring department may include and have control and/or access to multiple API walls, such as API wall 110b-1 or 110b-2, and monitor multiple departments within the organization and/or enterprise network or multiple enterprise networks based on the settings of the organization.

Figure 2:
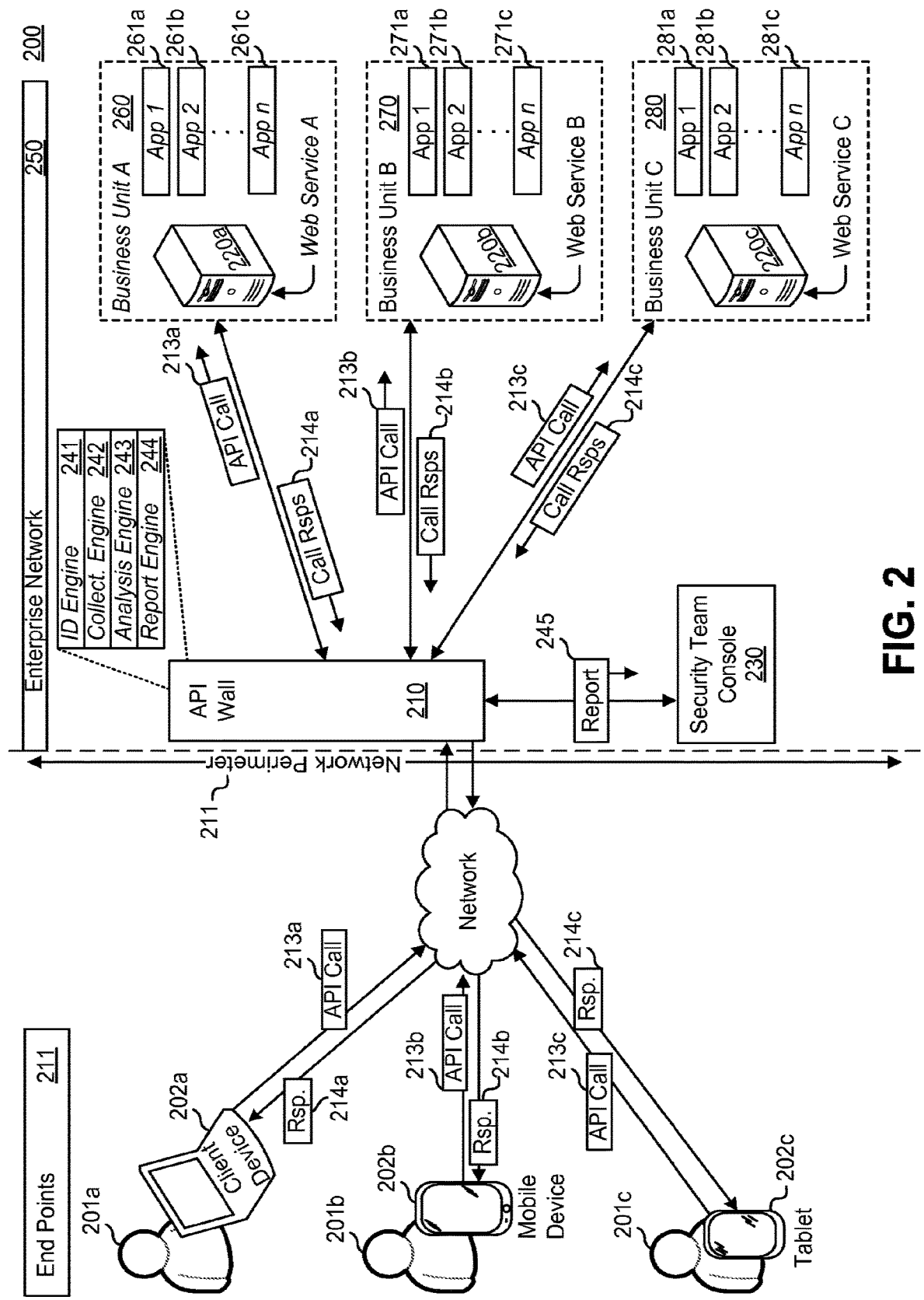
FIG. 2 is an illustrative example of a public network connected with an enterprise network in which various embodiments can be implemented.

FIG. 2 is an illustrative example of interconnected networks 200, specifically a public network connected with an enterprise network in which various embodiments can be implemented.

The enterprise network 250 may be a computer network, cloud architecture, or a combination thereof, configured to interconnect various websites in order to share computational resources. For example, the enterprise network may be a network built by a business that connects different websites, webpages, documents, etc. (e.g., production website, purchasing websites, sales pages, and the like) for a cohesive use among the business. The instant enterprise network includes multiple business units, business unit A 260, business unit B 270, and business unit C 280, where each business unit is operably interconnected to the API wall 210, and may be interconnected with one another.

The API wall may be located at the network perimeter 211, where the network perimeter is generally a boundary between the private, locally owned/managed side of a network and a public side of the network, such as a service provider-managed side by which users, such as human users 201a-c may connect with the private enterprise network of the business using endpoint devices, such as a client device 202a, a mobile device 202b, and a tablet device 202c, which connect to the enterprise network via the Internet 205. The API wall might also be located at a boundary between two or more intra-organization systems or two or more different services to provide similar functionality.

Business units for an enterprise may include a vast number of practice groups, departments, office locations, and additional subdivisions of the whole enterprise or organizations connected with the enterprise. For example, some business unit sub-categories may include billing and subscription management, human resources, corporate strategy and development, legal and risk management, sales, event management, and many more. For each business unit, any number of APIs or web services may be available. The APIs may have different structures; for example, the APIs may use different protocols (e.g., REST, HTTP, SOAP, etc.), different formats (e.g., JSON, HTML, XML, etc.), and/or different securities (e.g., no security, API Keys, OAuth2, etc.). In some enterprises, a single business unit, such as a human resources business unit, may have access to and/or host N different APIs. If, for example, an enterprise had K business units, that would be N*K APIs within the enterprise network, which, based on present methods in the art, would have to be manually monitored by an IT or security team; this would be a very difficult, if not impossible, task to achieve at all times, such as when N is in the hundreds and K is more than a few, perhaps more than ten.

However, according to example embodiments presented herein, the API wall 210 being placed at a network perimeter 211, as in the instant example, of an enterprise network 250, may be configured to intercept all API call requests, such as API call requests 213a-c from endpoint devices 202a-c. The API wall is configured, according to the example in FIG. 2, to receive API requests 213a-c and pass the requests on to specific business units. For example, the API call request 213a generated by endpoint device 202a is, after being intercepted by the API wall, routed to business unit A 260. Business unit A may include a web service A 220a, which may be implemented in hardware such as a web server or a software application implemented in a device or as SaaS. The business unit A and/or the web service may have a number of associated or hosted APIs, such as API 1 261a, API 2 261b, and API n 261c. The same example architecture is depicted for business units B and C.

Specifically, API call request 213b generated by endpoint device 202b is, after being intercepted by the API wall, routed to business unit B 270. Business unit B may include a web service B 220b, which may be implemented in hardware such as a web server or a software application implemented in a device or as SaaS. The business unit B and/or the web service may have a number of associated or hosted APIs, such as API 1 271a, API 2 271b, and API n 271c. Similarly, API call request 213c generated by endpoint device 202c is, after being intercepted by the API wall, routed to business unit C 280. Business unit C may include a web service C 220c, which may be implemented in hardware such as a web server or a software application implemented in a device or as SaaS. The business unit C and/or the web service C may have a number of associated or hosted APIs, such as API 1 281a, API 2 281b, and API n 281c.

Each of the respective business units, via the API and/or the web service, may, when appropriate or authorized, return an API call response 214a-c to the endpoint device. It should be understood by one of ordinary skill in the art that the endpoint may be an endpoint application, such as an instance of an endpoint app, which may generate multiple API call requests to different business units simultaneously or at different times.

Further example embodiments of the API wall 210 include the API wall being configured, upon intercepting either and/or both an API call request and an API call response, to monitor the intercepted traffic. For example, the API wall may include or be operably interconnected to a group of monitoring engines, such as an identification engine 241, a collection engine 242, an analysis and reporting engine 243, and/or a control engine 244.

Example embodiments of the API wall 210 operate via four main stages: identification stage, collection stage, reporting stage, and control stage, while other example embodiments may use some or all of the stages.

In some embodiments, during the identification stage at the identification engine 241, the API wall is configured to monitor some or all requests made to and responses from servers. Using an array of techniques, the API wall creates a list of APIs that are called across an enterprise network. The API wall is further configured to spider web assets to identify traffic, which may be human user traffic and/or automated-agent traffic, which originates from browser-driven website interaction. This set of browser-driven website interaction may be subtracted or removed from the total set of traffic recorded in order to aid in identifying API calls specifically, thus enabling the API wall, and users of it, to focus on security and administrative concerns focused on users in a public network accessing the organization's API located in the organization's private, enterprise network.

In some embodiments, during the collection stage at the collection engine 242, the API wall is configured to monitor how APIs are being used by endpoint applications, user devices, and the like. During the Collection phase, the API Wall monitors how APIs are being used. Properties measured include frequency, velocity, time of day, geolocation, whether the APIs are authenticated, if APIs are chained together with a call to one leading to calls to another, user characteristics, response times, and other characteristics, among other properties.

In some embodiments, during the reporting phase at the analysis and reporting engine 243, the API wall assembles statistics into reports, spreadsheets, documents, and the like, which are made available to security teams of the enterprise organization or other authorized users. Reports may include the information described as statistics (described in detail below concerning FIG. 3) along with analysis and recommendations. Some embodiments of the reporting function could include cross-company learning, where actions are taken to limit an API within one enterprise could be used to form a list of undesirable (e.g., dangerous, potentially unwanted, malicious, etc.) APIs to be limited at other organizations. Some libraries and middleware include APIs unknown to teams that deploy those products. The API wall is configured to monitor the API usage and compile intelligence about commonly abused APIs in these products and libraries.

The API wall, via the control engine 244, provides or makes available reports 245 and other documents to a security team console 230, where the security team console may include or be integrated with or connected to an API wall dashboard (illustrated and described in connection with FIG. 3). In some embodiments, during the last phase, the control stage at the control engine 244, security teams operating the API wall for an enterprise organization are able to limit access to APIs, modify access to APIs, create access control lists (ACLs), enforce ACLs, and/or change APIs from being unauthenticated access to being strictly authenticated access.

Some embodiments enable security teams to require access to the enterprise network/API supporting services over Transport Layer Security (TLS) to add security against some threats. For example, adding TLS support at the API wall allows enterprise security teams to increase security with little to no backend changes to code. That might also allow for security to increase without any code changes to the API, just configuration changes applied by an administrator of the API wall.

The API wall can be further configured to change the authentication method from a less secure method (e.g., a user-created username and password) to a more secure authentication (e.g., the use of a digital certificate issued/verified by a Certificate Authority as part of a public key infrastructure). For example, an API could be modified to accept OAuth, an open standard for authorization, rather than raw HTTP or basic HTTP authentication or others. Example embodiments of the API wall and the enterprise system encompassing the API wall may be configured to modify the output of APIs from XML data to JSON data, or change the signature or certificate for credentials of the API altogether. For example, an API could be modified from Common Gateway Interface (CGI) architecture to a representation state transfer (REST) architecture.

In alternative example embodiments, multiple API walls may be implemented at different locations within the enterprise network infrastructure. For example, in place of the API wall 210 located at the network perimeter 211 as depicted in FIG. 2, multiple API walls may be deployed at the network perimeter, where each API wall services a different business unit, web server, supporting service, and/or API. The multiple API walls might be clustered together to provide for a scalable API wall infrastructure.

Further, individual API walls may be operably interconnected with a specific business unit or web server, such that any API call request directed to business A 260, for example, would pass through the network perimeter of the enterprise network and be routed directly to business unit A, whether the API call request would be intercepted by the API wall for that business unit, whereas, and API call request for an API serviced by a web server or supporting service in business unit C 280, would not be intercepted/monitored by the API wall for business unit A. Such an example embodiment may be used for load balancing purposes, for example, when many API call requests would otherwise cause resources to be handling computationally heavier loads.

Further combinations or multiple API walls may be used throughout the enterprise network when desired by the organization's security team or other authorizing body. A clustering deployment with cluster leaders, or a high-availability architecture with pairing of systems might be provided.

In alternative example embodiments, the API wall may be located in other areas of the network, such as at a web server; further, multiple API walls may be configured within or interconnected within the enterprise network.

Figure 3:
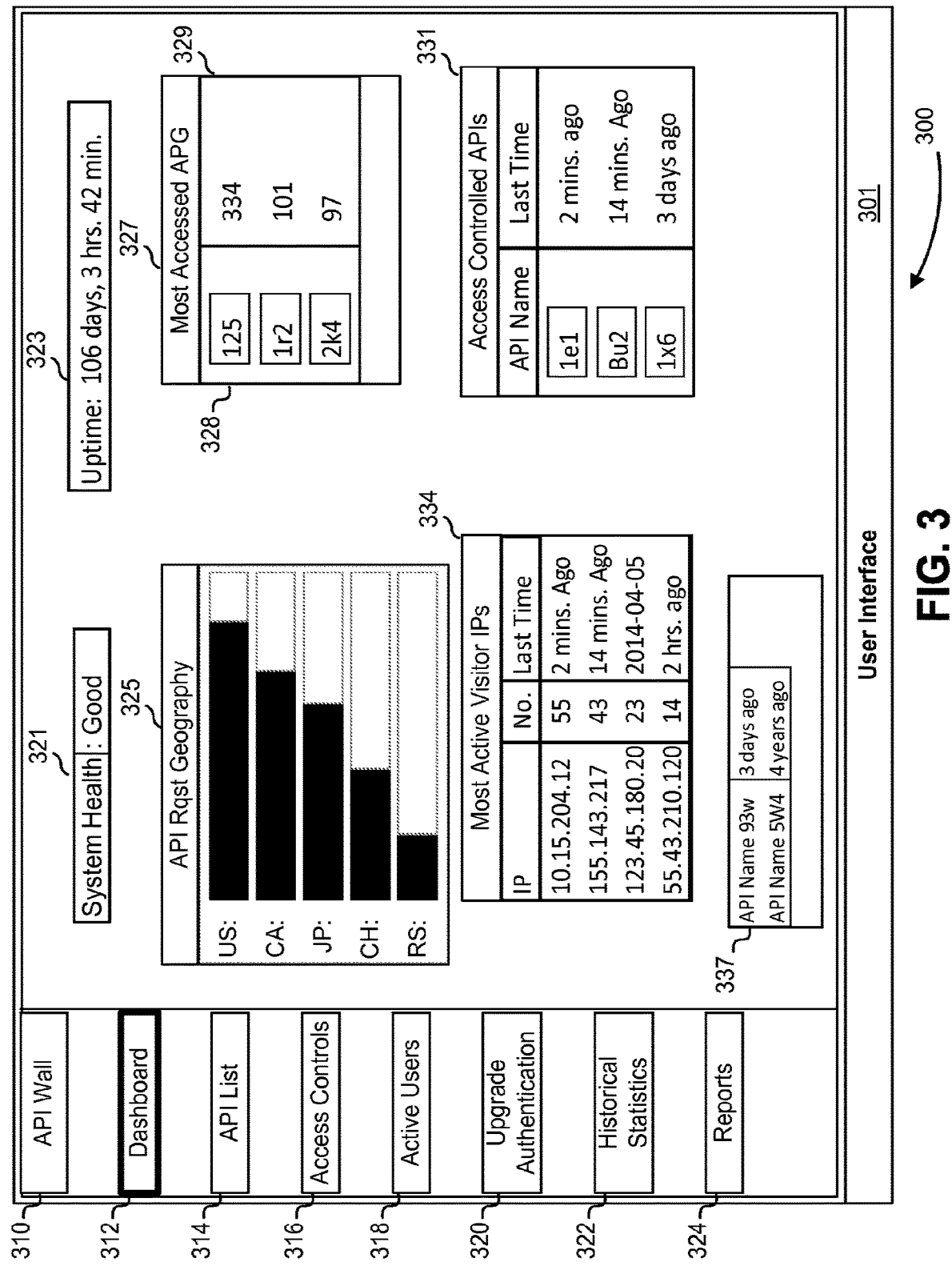
FIG. 3 is a block/functional diagram of a graphical user interface of a dashboard in accordance with at least one embodiment.

FIG. 3 is an example embodiment of a graphical user interface 300 of a dashboard in accordance with at least one embodiment.

In some example embodiments, an endpoint device or application may be initialized with respect to the API wall before, during, or after an API call request is passed to a web service, such as when the first API call is generated at the endpoint and intercepted by the API wall. The API wall may then maintain a database or repository of information related to the endpoint with a unique identifier in order to monitor the endpoint in an API wall dashboard.

For example, an API wall 310 may include and/or generate a user interface 301 to provide a display of key performance indicators that may be used by a security team or other authorized person to more closely and effectively monitor any and all APIs hosted by the enterprise network. The dashboard 312 may include an API list 314, access controls 316, active user information 318, upgrade authentication monitoring 320, historical statistics 322, reports 324, and additional identifying and monitoring sub-systems.

The graphical user interface (GUI) 301 provides graphical representations of the system health 321, and the time the system has been running 323. The GUI further provides information on the geographical areas in which the API call requests originate (325), a list of most accessed APIs (327), which may provide the name of the API 328 and the number of time the API has been accessed (329). The GUI further provides visual representations of the IP addresses of the most active visitors (334), access controlled APIs 331, and newly accessed APIs 337.

Example embodiments of the API wall dashboard may include a user interface that organizes and presents information in a manner that is easy to view and understand. The dashboard may further provide representations of the collection of statistics, characteristics, and properties of components of API call requests, responses, and usage is maintained, in at least one example embodiment, in a dashboard graphical user interface display.

Further example embodiments include providing additional business intelligence (BI) based, at least in part, on statistics and characteristics identified by the API wall or component thereof. The additional BI may include, for example, reporting on metrics related to API uses as used or attempted to be used by an endpoint application and/or an endpoint user device (or between services within an organization), providing automated monitoring and alerting regarding thresholds of characteristics or statistics being met (e.g., the same IP address accessing the same API at a predetermined high level), and providing access to data to help enterprise users, such as a security team, make better business decisions.

Further example embodiments enable recommendations to be suggested as to an action for the security team or other enterprise users to take in response to the information collected and analyzed by the API wall or components thereof.

Figure 4:
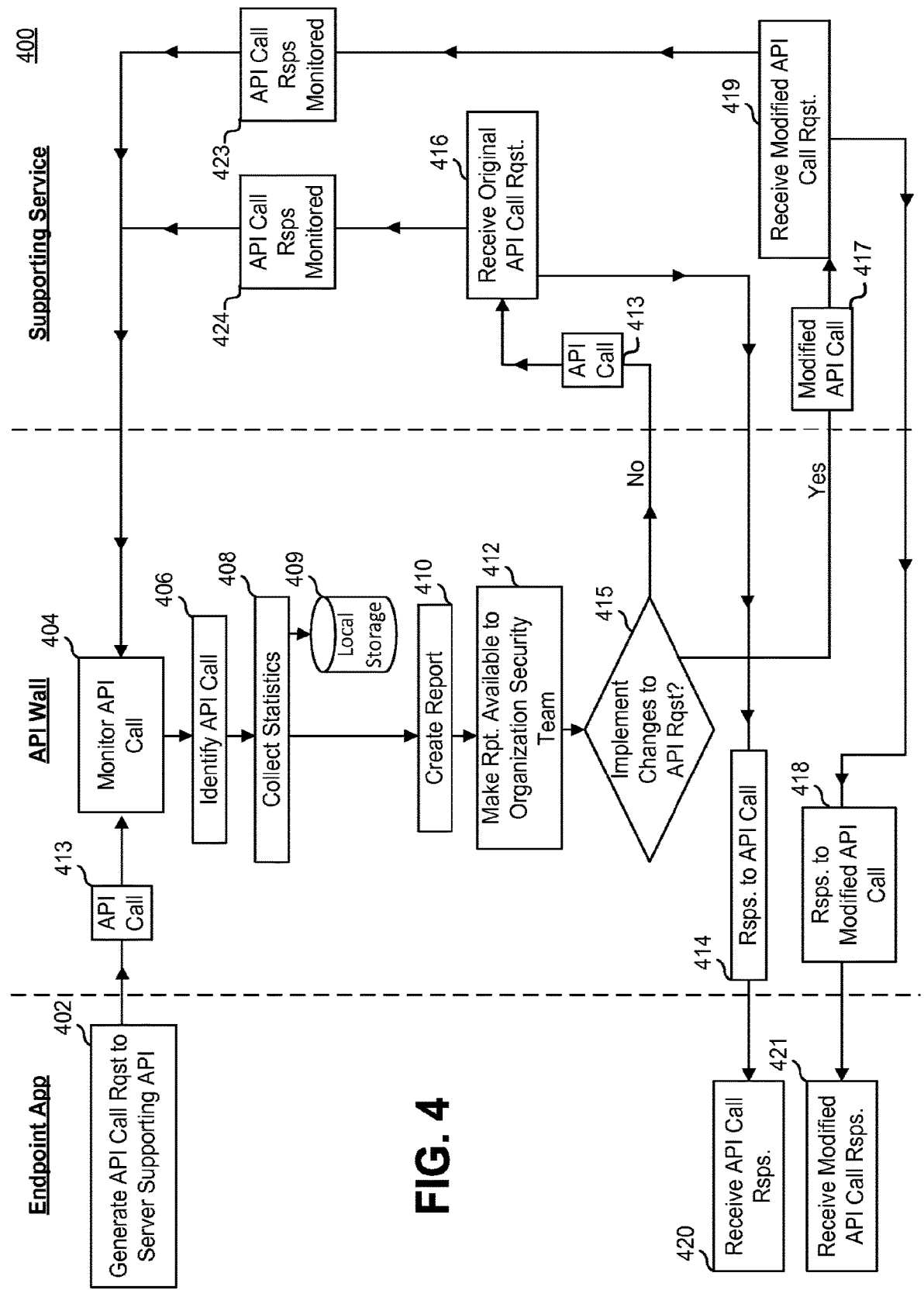
FIG. 4 is a swim diagram illustrating interactions of an endpoint application running on an endpoint computer system, a server servicing API calls for that endpoint, and an API wall for monitoring the interaction.

FIG. 4 is a swim diagram illustrating interactions of an example new application programming interface (API) call request process for an endpoint app running on an endpoint computer system (such as a user device) and a supporting server servicing API calls for that app. It should be apparent from this disclosure, that the example could be extended to machine-to-machine interactions.

In this example, the endpoint app is assumed to be an application installed on a user device, such as mobile device 202b or tablet device 202c as described and illustrated in connection with FIG. 2. Examples of user devices include smartphones or tablets running the iOS™ operating system or the Android™ operating system and can include devices that obtain apps solely through a centralized repository of apps as well as those that obtain apps through other channels. The endpoint app might be obtained directly from a user operator or might be obtained from a centralized repository of apps. Examples of centralized repository of apps include the App Store™ app repository operated by Apple Computer and the Google Play™ app marketplace.

In step 402, the endpoint app generates an API call request to a server supporting an API. As explained later in this example, since an endpoint app and an API call filtering system (API wall) do not have to be pre-configured such that each user device is initialized with respect to the API wall, the API wall may have no identifying information about the endpoint app and/or the API or servicing server being requested. In other embodiments, the API wall may maintain or request information from the endpoint app for authentication and/or authorization purposes prior to intercepting or monitoring any requests transmitted from the endpoint app.

In step 404, the API wall (implemented in hardware, software, or cloud-based code executing on the API wall device) monitors the API call request 413. Monitoring the API call request may include additional steps, such as the API wall may identify the API call at step 406 and collect information at step 408, characteristics, and/or statistics relating to the endpoint app, user device on which the endpoint app is running, API usage statistics, and other key indicators determined by the organization's security team, networking authority, or dynamically chosen by the API wall based on pre-determined factors. At step 409, the collected information from step 408 may be locally stored in a database, table, or the like for future use. In step 410, the API wall may create a report, or may be operably interconnected with a reporting engine to create a report, relating to the collected statistics; such a report may include an analysis of the collected information, recommendations as to an action or non-action to take in response to the information, provide warnings as to malicious behavior, and the like. In step 412, the report is made available to the organization's security team for review and use.

At step 415, the API wall may dynamically implement changes to the API call request 413 according to a pre-determined series of logic determined by the organization or policies, or, the organization's security team or authorized user may determine manually to implement changes to the original API call request. If the API wall is directed not to implement any changes, the original API call request 413 will be passed to the supporting service (such as a set of servers programmed to support a particular API, using HTTP or other protocol), which, at step 416, will receive the original API call request from the endpoint app and, at step 414, an API call response to the original API call request is passed to the endpoint app. At or around the same point in time of step 414, the supporting service's API call response is passed back, in step 424, to the API wall to be monitored. Thus, at step 420, the endpoint app receives the API call response from the supporting service, which would then continue processing as programmed. This process would be repeated as often as needed.

However, returning to step 415, if the API wall dynamically determines or the organization's security team manually decides to implement some form of change to the API call request, the supporting service, at step 419, will receive a modified version of the API call request 417. In alternative embodiments, depending on the modifications made to the API call request, no request may be passed if it is determined, for example, to block such an API call request. Returning to step 419, after the supporting service receives the modified API call request, the supporting service, at step 418, passes a modified API call response back to the endpoint app via a network. At or around the same point in time of step 419, the supporting service's API call response is passed, in step 423, back to the API wall to be monitored. Thus, at step 421, the endpoint app receives the modified API call response from the supporting service, which would then continue processing as programmed. This process would be repeated as often as needed.

Figure 5:
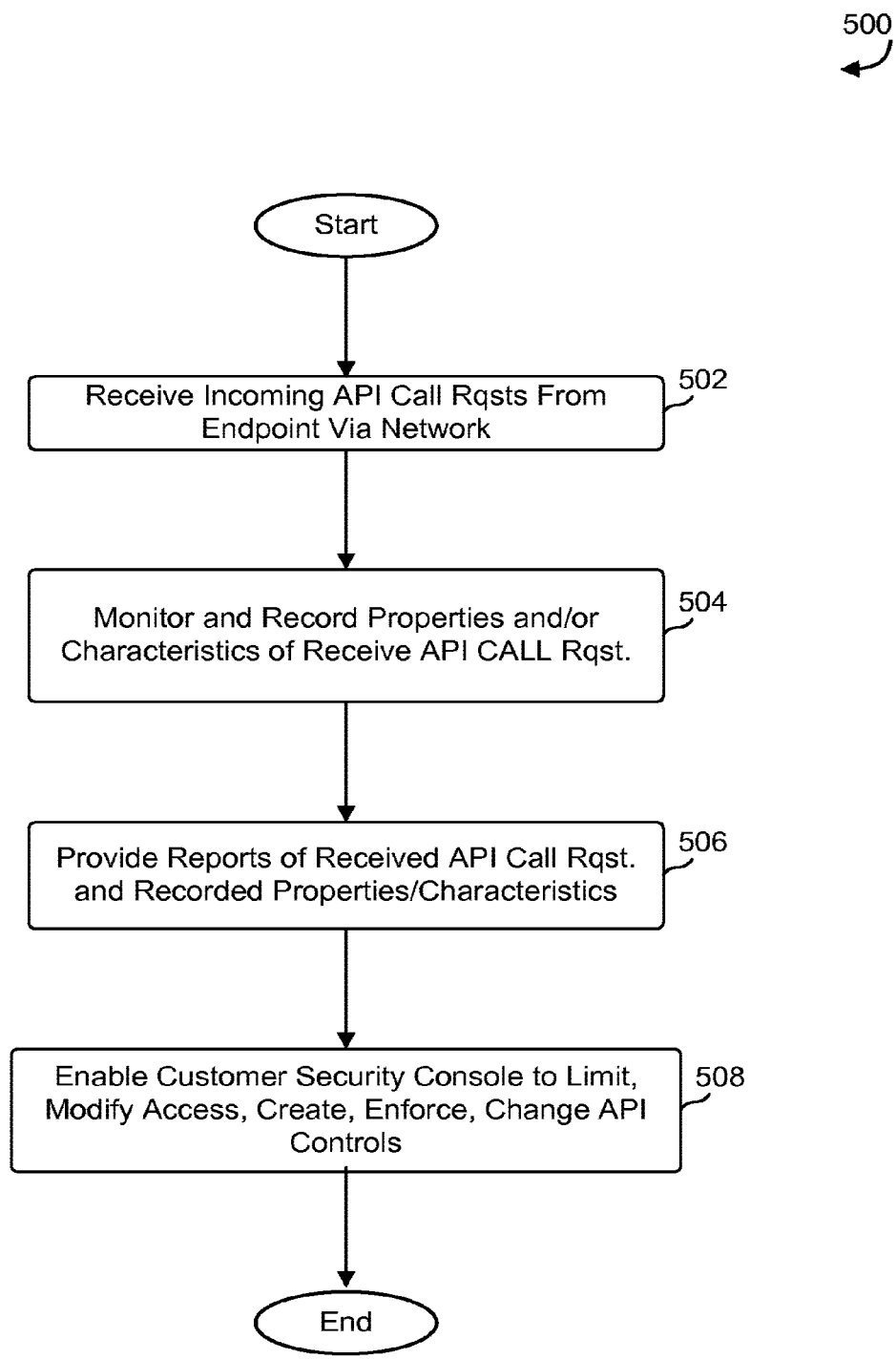
FIG. 5 is a block diagram of a process for improving security using API monitoring and filtering in accordance with at least one embodiment.

FIG. 5 is a block diagram illustrating a process 500 for improving security in an enterprise network using API monitoring and filtering in accordance with an example embodiment presented herein. The process 500 may be performed by any suitable system, such as by the API wall 110 as described and illustrated in connection with FIG. 1 and/or any suitable system or component thereof. Returning to FIG. 5, according to the process 500, the API wall receives incoming API call requests from an endpoint via a network (502). It should be apparent from this disclosure, that these examples could be extended to intra-organizational services.

The API wall monitors and records properties and/or characteristics of the received API call requests (504). The API wall provides a report of received API call requests and recorded properties/characteristics (506). The API wall enables customer security console to limit, modify access, create, enforce, and/or change API controls (508).

Figure 6:
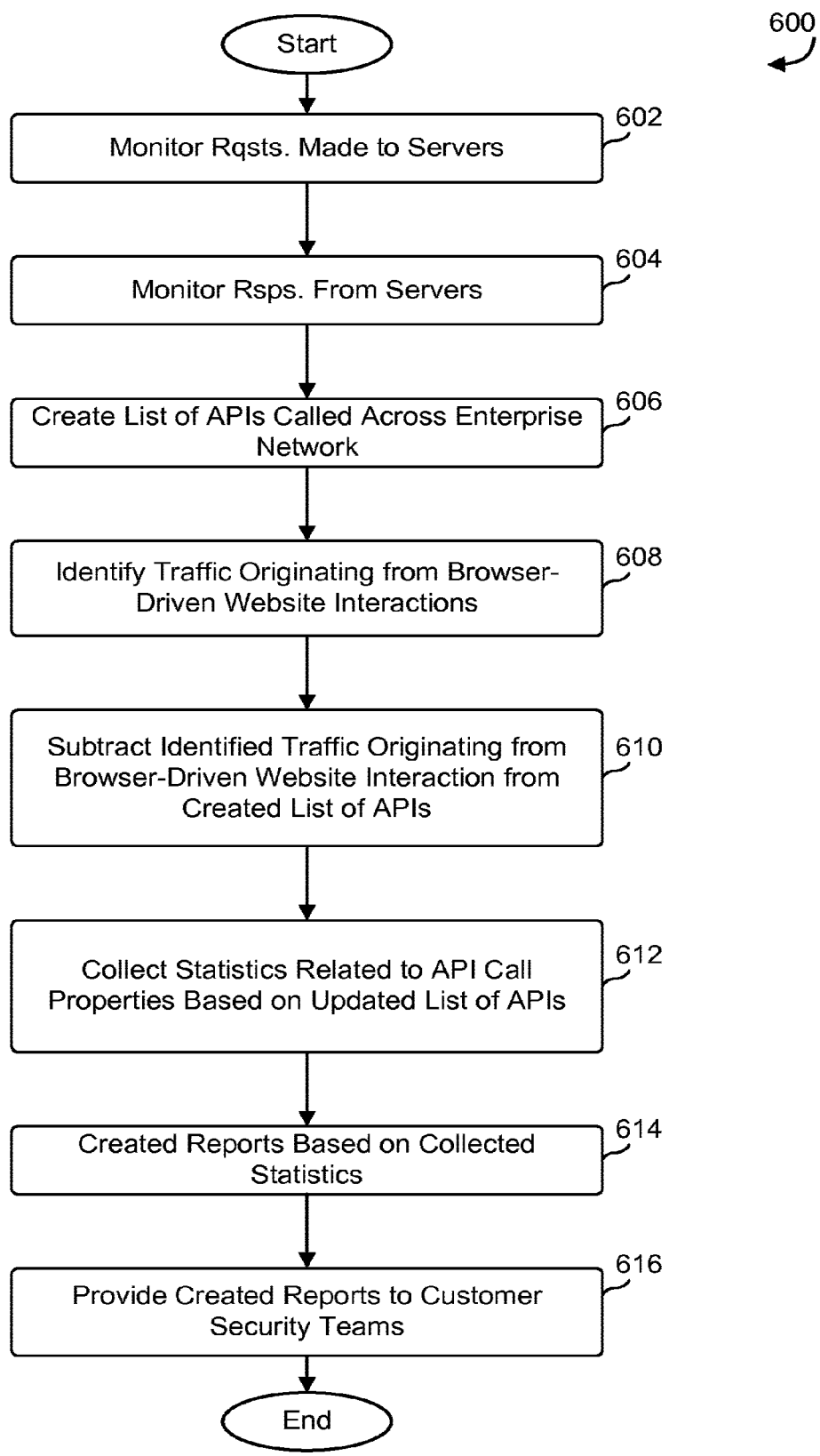
FIG. 6 is a block diagram of a process for improving security in an enterprise network using API monitoring and filtering in accordance with at least one embodiment.

FIG. 6 is a block diagram illustrating a process 600 for improving security in an enterprise network using API monitoring and filtering in accordance with an example embodiment presented herein. The process 600 may be performed by any suitable system, such as by the API wall 210 as described and illustrated in connection with FIG. 2 and/or any suitable system or component thereof. Returning to FIG. 6, according to the process 600, the API wall monitors requests made to web servers supporting API services (602). The API wall monitors API call responses from servers (604) and creates at least one list of APIs called across the enterprise network (606).

The API wall further identifies traffic originating from browser-driven website interaction (608) and the API wall subtracts identified traffic originating from browser-driven website interaction from created list of APIs (610). For example, as the network level API requests and web based GET/POST requests look similar, the GET and POST (and other) requests that represent serving normal browser based web traffic are subtracted from the portion of traffic managed by the API wall. In other example embodiments, the web content may also make use of the APIs. In further example embodiments, the API wall may identify traffic originating from a single page web app in which the web services are updated without reloading the web service, whether it is a single page app or a web page using Ajax requests.

Further, the API wall collects statistics related to API call properties based on updated list of APIs (612) and creates one or more reports or documents based on collected statistics (614), which are then provided to an enterprise's security team (616).

Figure 7:
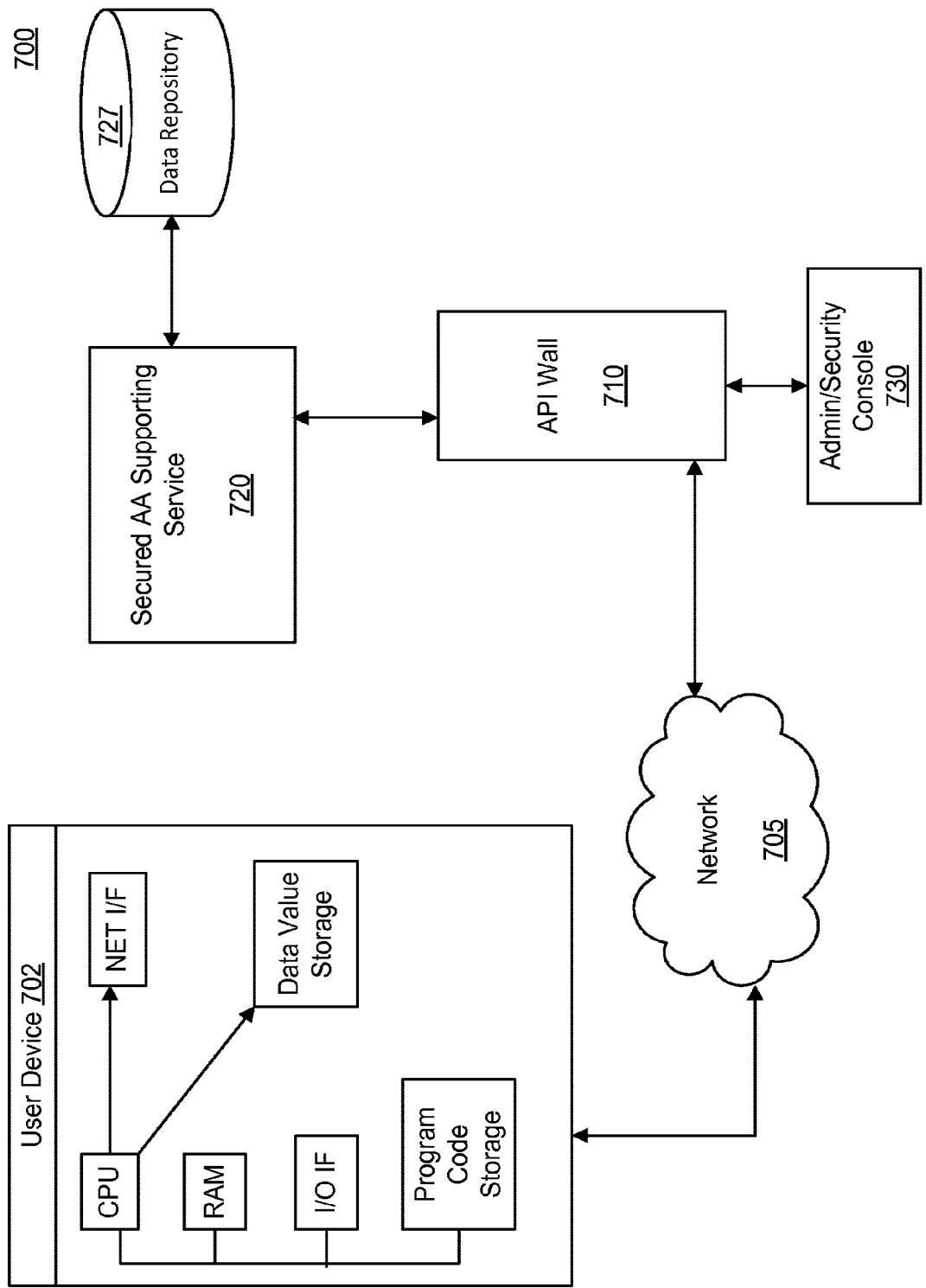
FIG. 7 is a block diagram of a networked computer system in which the processes and elements of FIGS. 1-4 may be used.

FIG. 7 is a block diagram of a networked computer system in which the processes and elements of FIGS. 1-6 might be used. As illustrated there, a networked computer system 700 comprises one or more client/endpoint/user devices 702 operated by users (and some attackers, possibly) to interface to one or more secured API supporting services 720 via a network 705. The networked computer system 700 includes at least one API wall 710 and an administrative or security console 730, each of which might be able to communicate via network 705. Supporting service 720 might be coupled to a data repository 727.

In an alternative example embodiment, the supporting service 720 connects directly to the network 705, such that not all traffic must pass through the API wall. In yet other examples, traffic between enterprise services passes through the API wall, thus protecting organizational- or enterprise-internal APIs.

Figure 8:
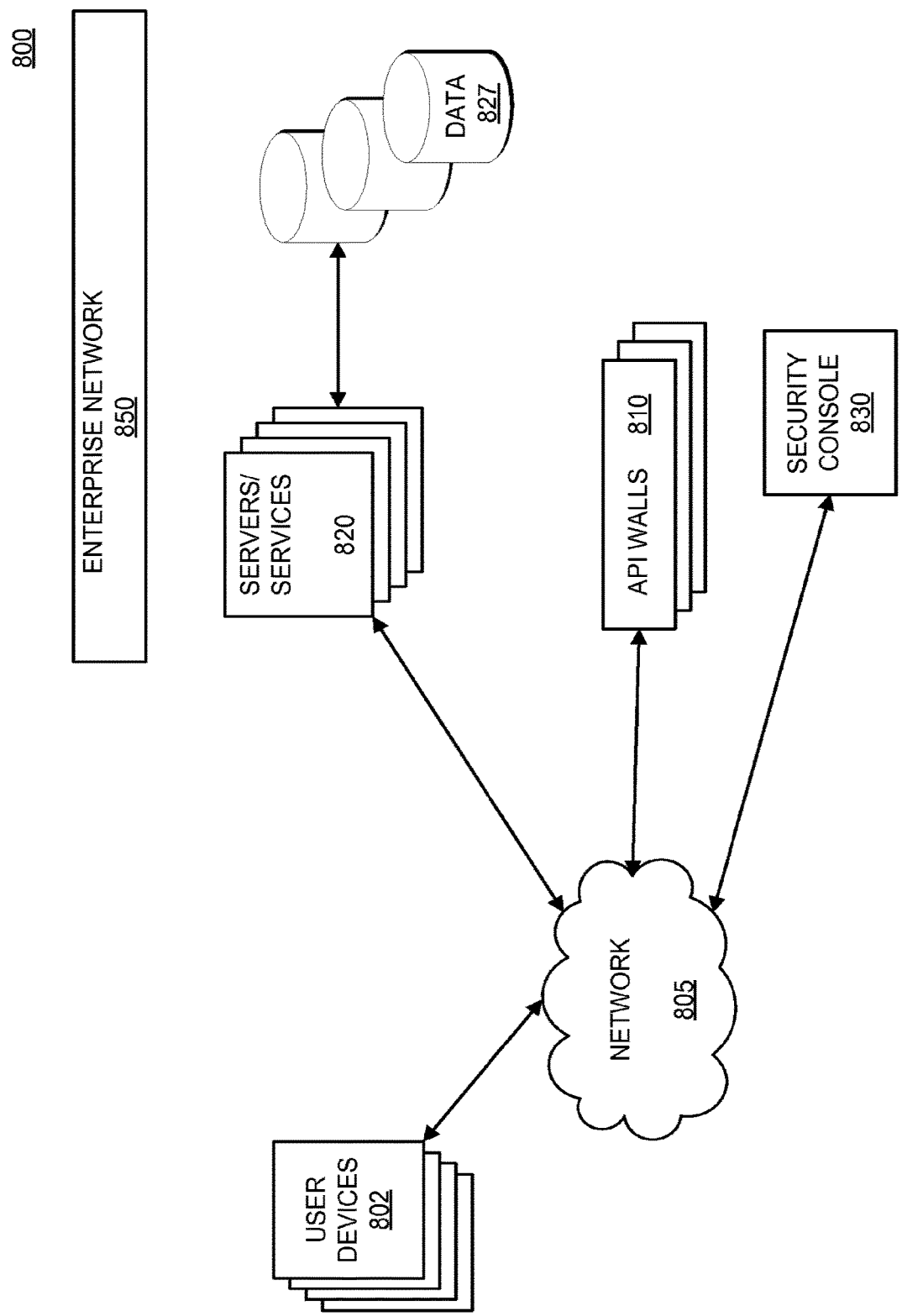
FIG. 8 is a block diagram a generalized networked computer system in which processes of FIGS. 1-6 may be used.

FIG. 8 is a block diagram similar to FIG. 7 shown in greater scale, for multiple user devices and multiple supporting servers. As shown there, user devices 802 communicate with multiple web servers or supporting services 829, and may communicate with an API wall 810 as well. For fully secured APIs, it may be that the user devices can only communicate with servers/services via the API wall. The communication shown is via a network 805; however, additional paths, as explained elsewhere herein, might be used. Servers/services 820 might provide the user devices 802 with access to multiple data stores or warehouses 827 and/or other networked resources within the enterprise network 850 or operably interconnected therewith.

A user device or app server, etc. might include various components. For example, a user device might comprise a central processing unit (CPU), random access memory, storage for data values such as a private key and an UEID, a network interface and an input/output interface. A system bus might connect the various components.

Typically, the CPU capable of processing instructions for execution that it reads from program code storage, which might be random-access memory (RAM), read-only memory (ROM), flash, magnetic storage, etc. The CPU may be designed using any of a number of architectures, such as a Complex Instruction Set Computer (CISC) processor, a Reduced Instruction Set Computer (RISC) processor, or a Minimal Instruction Set Computer (MISC) processor. The CPU might be a single-threaded processor or a multi-threaded processor. Additional functionality might be provided by a graphics input/output (I/O) system and processor.

In some implementations, the memory used is a computer-readable medium, such as a volatile memory unit or a non-volatile memory unit. Various storage devices might be capable of providing mass storage for various needs. For example, in one implementation, storage devices comprise flash drive devices, floppy disk devices, hard disk devices, optical disk devices, tape devices, or the like.

Input/output devices might include a keyboard and/or pointing device and a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data. Storage devices suitable for tangibly embodying computer program instructions and data include many forms of non-volatile memory, including, by way of example, semiconductor memory devices, such as erasable programmable ROM (EPROM), electrically erasable programmable ROM (EEPROM), and flash memory devices, magnetic disks such as internal hard disks and removable disks, magneto-optical disks; and CD-ROM and DVD-ROM disks.

The processor and the memory can be supplemented by, or incorporated in, application-specific integrated circuits (ASICs). To provide for interaction with a user, the features can be implemented on a computer having a display device such as a cathode ray tube (CRT) or liquid crystal display (LCD) monitor for displaying information to the user and a keyboard and a pointing device such as a mouse or a trackball, or a touchscreen, by which the user can provide input to the computer. Additionally, such activities can be implemented via touchscreen flat panel displays and other appropriate mechanisms.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by some form or medium of digital data communication such as a communication network. Examples of communication networks include a LAN, a WAN, peer-to-peer networks (having ad-hoc or static members), grid computing infrastructures, and the Internet.

The computer hardware described herein might be used with the computer software described herein unless otherwise indicated. The software can be written in one or more languages and be stored in different forms of memory or storage. The computer hardware described and illustrated might include various forms of digital computers, such as laptops, desktops, workstations, personal digital assistants, servers, blade servers, mainframes, and other appropriate computers.

The user device might include mobile devices, such as personal digital assistants, cellular telephones, smartphones, and other similar computing devices. Additionally the system can include portable storage media, such as Universal Serial Bus (USB) flash drives. For example, the USB flash drives may store operating systems and other applications. The USB flash drives can include input/output components, such as a wireless transmitter or USB connector that may be inserted into a USB port of another computing device.

The computer system can include clients and servers. A client and server are generally remote from each other and typically interact through a network. The relationship of client and server arises by virtue of computer programs running on the respective computers and having a client-server relationship to each other. An endpoint device is a device that connects, in some manner, to at least one of the servers, directly or indirectly, to perform some end goal. Where one device is designated as an endpoint device, it may be that that endpoint device is a client in some client-server relationship, but it could also be a server in some instances and there may be intermediaries that are treated as client-server combinations.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Other implementations are within the scope of the following claims. Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. An application programming interface (API) call filtering system comprising one or more API wall devices, server devices, or client devices with memory comprising programmed instructions stored thereon and one or more processors configured to be capable of executing the stored programming instructions to:
monitor one or more authentication methods of one or more API call requests received via one or more networks from an endpoint application and directed to an API service;
receive a security action input in response to an output report generated based at least in part on authentication method information compiled based on the monitoring;
modify one of the authentication methods of at least one subsequent API call request based on the received security action input to require that the at least one subsequent API call request satisfies an authentication test; and
send the modified at least one subsequent API call request to the API service.

2. The API call filtering system of claim 1, wherein the one or more processors are further configured to be capable of executing the stored programming instructions to compile one or more performance indicators based on the monitoring, wherein the output report is further generated based on the compiled one or more performance indicators, the one or more performance indicators include a frequency, a velocity, a time of day, a geo-location, or an authentication indicator related to the one or more API call requests, and the output report includes an analysis of the performance indicators and at least one recommendation of an action or non-action to take in response to another one or more API call requests.

3. The API call filtering system of claim 2, wherein the one or more processors are further configured to be capable of executing the stored programming instructions to:
obtain the one or more performance indicators;
determine identification criteria based, at least in part, on the one or more performance indicators; and
identify, using the identification criteria, the API to which the API call requests are transmitted.

4. The API call filtering system of claim 1, wherein the one or more processors are further configured to be capable of executing the stored programming instructions to change access permissions in an access control list (ACL) for the API from unauthenticated access permissions to authenticated access permissions or to modify access to the API, limit access to the API by throttling or reducing throughput, or block access to the API.

5. The API call filtering system of claim 1, wherein the one or more API call requests received from the endpoint application include requests to authenticate the endpoint application with respect to a secure account maintained at, or for, the API service.

6. The API call filtering system of claim 2, wherein the one or more processors are further configured to be capable of executing the stored programming instructions to utilize a non-deterministic algorithm to analyze the performance indicators.

7. An application programming interface (API) wall device, comprising memory comprising programmed instructions stored thereon and one or more processors configured to be capable of executing the stored programmed instructions to:
monitor one or more authentication methods of one or more API call requests received via one or more networks from an endpoint application and directed to an API service;
receive a security action input in response to an output report generated based at least in part on authentication method information compiled based on the monitoring;
modify one of the authentication methods of at least one subsequent API call request based on the received security action input to require that the at least one subsequent API call request satisfies an authentication test; and
send the modified at least one subsequent API call request to the API service.

8. The API wall device of claim 7, wherein the one or more processors are configured to be capable of executing the stored programmed instructions to compile one or more performance indicators based on the monitoring, wherein the output report is further generated based on the compiled one or more performance indicators, the one or more performance indicators include a frequency, a velocity, a time of day, a geo-location, or an authentication indicator related to the one or more API call requests, and the output report includes an analysis of the performance indicators and at least one recommendation of an action or non-action to take in response to another one or more API call requests.

9. The API wall device of claim 8, wherein the one or more processors are configured to be capable of executing the stored programmed instructions to:
obtain the one or more performance indicators;
determine identification criteria based, at least in part, on the one or more performance indicators; and
identify, using the identification criteria, the API to which the API call requests are transmitted.

10. The API wall device of claim 7, wherein the one or more processors are configured to be capable of executing the stored programmed instructions to change access permissions in an access control list (ACL) for the API from unauthenticated access permissions to authenticated access permissions or to modify access to the API, limit access to the API by throttling or reducing throughput, or block access to the API.

11. The API wall device of claim 7, wherein the one or more API call requests received from the endpoint application include requests to authenticate the endpoint application with respect to a secure account maintained at, or for, the API service.

12. The API wall device of claim 8, wherein the one or more processors are configured to be capable of executing the stored programmed instructions to utilize a non-deterministic algorithm to analyze the performance indicators.

13. A network security method implemented by an application programming interface (API) call filtering system comprising one or more API wall devices, server devices, or client devices, the method comprising:
monitoring one or more authentication methods of one or more API call requests received via one or more networks from an endpoint application and directed to an API service;
receiving a security action input in response to an output report generated based at least in part on authentication method information compiled based on the monitoring;
modifying one of the authentication methods of at least one subsequent API call request based on the received security action input to require that the at least one subsequent API call request satisfies an authentication test; and sending the modified at least one subsequent API call request to the API service.

14. The network security method of claim 13, further comprising compiling one or more performance indicators based on the monitoring, wherein the output report is further generated based on the compiled one or more performance indicators, the one or more performance indicators include a frequency, a velocity, a time of day, a geo-location, or an authentication indicator related to the one or more API call requests, and the output report includes an analysis of the performance indicators and at least one recommendation of an action or non-action to take in response to another one or more API call requests.

15. The network security method of claim 14, further comprising:
obtaining the one or more performance indicators;
determining identification criteria based, at least in part, on the one or more performance indicators; and
identifying, using the identification criteria, the API to which the API call requests are transmitted.

16. The network security method of claim 13, further comprising changing access permissions in an access control list (ACL) for the API from unauthenticated access permissions to authenticated access permissions or to modify access to the API, limit access to the API by throttling or reducing throughput, or block access to the API.

17. The network security method of claim 13, wherein the one or more API call requests received from the endpoint application include requests to authenticate the endpoint application with respect to a secure account maintained at, or for, the API service.

18. The network security method of claim 14, further comprising utilizing a non-deterministic algorithm to analyze the performance indicators.

19. A non-transitory computer readable medium having stored thereon instructions for application programming interface (API) call filtering comprising executable code that, when executed by one or more processors, causes the one or more processors to:
monitor one or more authentication methods of one or more API call requests received via one or more networks from an endpoint application and directed to an API service;
receive a security action input in response to an output report generated based at least in part on authentication method information compiled based on the monitoring;
modify one of the authentication methods of at least one subsequent API call request based on the received security action input to require that the at least one subsequent API call request satisfies an authentication test; and
send the modified at least one subsequent API call request to the API service.

20. The non-transitory computer readable medium of claim 19, wherein the executable code, when executed by the one or more processors, further causes the one or more processors to compile one or more performance indicators based on the monitoring, wherein the output report is further generated based on the compiled one or more performance indicators, the one or more performance indicators include a frequency, a velocity, a time of day, a geo-location, or an authentication indicator related to the one or more API call requests, and the output report includes an analysis of the performance indicators and at least one recommendation of an action or non-action to take in response to another one or more API call requests.

21. The non-transitory computer readable medium of claim 20, wherein the executable code, when executed by the one or more processors, further causes the one or more processors to:
obtain the one or more performance indicators;
determine identification criteria based, at least in part, on the one or more performance indicators; and
identify, using the identification criteria, the API to which the API call requests are transmitted.

22. The non-transitory computer readable medium of claim 19, wherein the executable code, when executed by the one or more processors, further causes the one or more processors to change access permissions in an access control list (ACL) for the API from unauthenticated access permissions to authenticated access permissions or to modify access to the API, limit access to the API by throttling or reducing throughput, or block access to the API.

23. The non-transitory computer readable medium of claim 19, wherein the one or more API call requests received from the endpoint application include requests to authenticate the endpoint application with respect to a secure account maintained at, or for, the API service.

24. The non-transitory computer readable medium of claim 20, wherein the executable code, when executed by the one or more processors, further causes the one or more processors to utilize a non-deterministic algorithm to analyze the performance indicators.

* * * * *